(No Model.)
J. A. TILDEN.
ROTARY WATER METER.
No. 375,108. Patented Dec. 20, 1887.
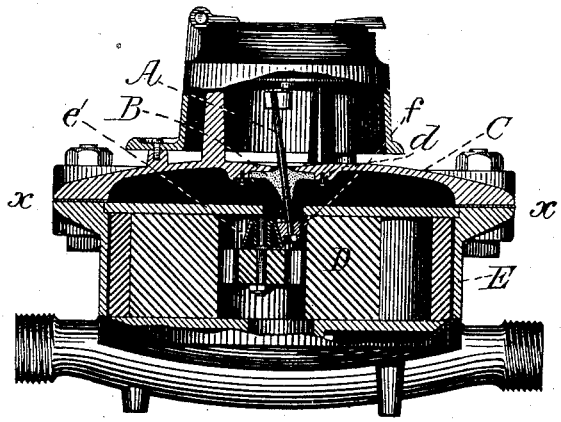
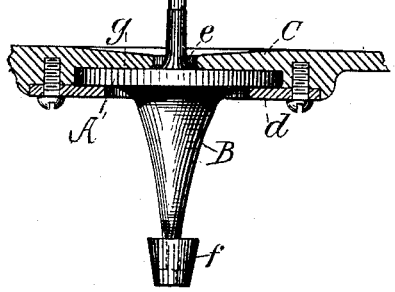
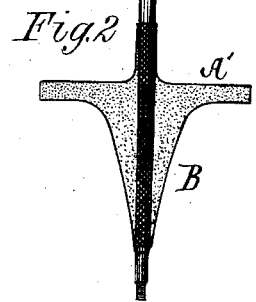
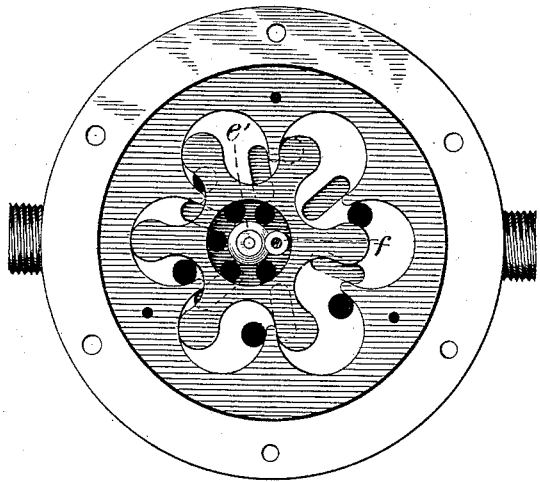
Witnesses:
J. M. Dolan
Fred. B. Dolan.
Inventor,
James A. Tilden
by his attys
Clarke & Raymond

UNITED STATES PATENT OFFICE.

JAMES A. TILDEN, OF HYDE PARK, MASSACHUSETTS, ASSIGNOR TO THE HERSEY METER COMPANY, OF PORTLAND, MAINE.

ROTARY WATER-METER.

SPECIFICATION forming part of Letters Patent No. 375,108, dated December 20, 1887.

Application filed January 20, 1887. Serial No. 224,964. (No model.)

*To all whom it may concern:*

Be it known that I, JAMES A. TILDEN, of Hyde Park, in the county of Norfolk and State of Massachusetts, a citizen of the United States, have invented a new and useful Improvement in Fluid-Meters, of which the following is a full, clear, and exact description, reference being had to the accompanying drawings, forming a part of this specification, in explaining its nature.

The object of the invention is to provide a device or connection between the piston or working part of a meter and the registering mechanism which offers as little resistance as possible to the operation of the working parts of the meter, and which at the same time is positive and accurate in transmitting the exact movement of the piston or working part to the register, and which provides for a perfectly secure and tight joint between the measuring-chamber of the meter and that containing the registering mechanism.

In order that the motion of the piston obtained by the passage of water through the meter may be transmitted to a registering device outside the meter, it is necessary that a perfectly water-tight joint should be secured where the spindle or communicating device passes through the meter-casing. This has been done by the use of a stuffing-box, through which a connecting-spindle is passed. This construction, however, is objectionable, because the friction caused by the pressure of the packing in the stuffing-box is so great that it is practically impossible to drive the registering devices directly from the moving piston. The retardation of the piston by the friction of the stuffing-box interferes with the accurate measurements of the water. To overcome this a train of gears has been introduced between the working parts of the meter and the stuffing-box, whereby a leverage is obtained which reduces the friction upon the working part of the meter which comes in contact with the register-driving device. It will be seen at once, however, that the introduction of a train of gears inside of the meter not only adds to the bulk of the meter, but makes an additional expense, and at the same time, owing to its operation in the water, is subjected to a constant wear, depending in its extent upon the kind of water in which it runs, some water being very hard and containing grit and sediment, which cause it to give out rapidly. It is to overcome these defects, which are common to most meters now used, that my invention is intended.

In the drawings, Figure 1 represents an elevation of the device which constitutes my improvement, showing the manner in which it is secured to the meter-case. Fig. 2 is a vertical section through the device. Fig. 3 is a sectional view of a meter provided with my improvement. Fig. 4 is a plan of the meter, taken below the line $x$ $x$ of Fig. 3.

A represents a metal spindle, to which is secured rubber or other similar flexible material, having the form shown in Fig. 1—that is, provided with a disk, A', and the long tapering downward extension B, and preferably with an upper sleeve or extension. In the upper portion of the meter-casing there is a round hole, $e$, through which the spindle passes, and which is sufficiently large to allow of its free vibratory movement therein. The rubber attachment to the spindle is secured to the casing by means of a clamp or binding-ring, which rests upon the under surface of the disk near its edge and clamps it against the under surface of the meter-casing. A shoulder is formed in the casing of a size to receive the rubber disk and to keep it and the spindle central with the hole through which the spindle passes.

In order that the rubber may be firmly attached to the spindle, so that the constant working of the rubber may not loosen the spindle and allow leakage around it, the spindle is burred or roughened throughout the length which is inclosed by the rubber, as shown in Fig. 2, and the rubber is shaped and attached to the spindle by molding under pressure and fills up the indentations formed in the spindle, making a perfectly tight and secure fastening. I would say, however, that I do not confine myself to this especial method of securing the rubber to the spindle.

By forming the rubber in the manner shown I am enabled to obtain the greatest strength at the point where it is most liable to give out. Should a straight diaphragm be used, the pressure of the water in the meter, which is at times very great, would force the rubber outward through the opening in the case at the center and destroy its utility; but by forming the device as shown a mass of rubber is presented to the pressure of the water at the point where greatest strength is required.

It will also be seen that by fastening the rubber on the inside of the case at the extreme edge of the disk, and so that the case extends upon or laps over the disk to a considerable extent, as shown at $g$, Fig. 1, the rubber is backed or re-enforced against the outward pressure of the water, and is yet free to conform to the movement of the spindle.

It will be desirable, as a rule, to use pure rubber for this part of the device, as pure rubber is very flexible and is capable of being moved or vibrated with very little friction; but, as above indicated, I do not confine myself thereto.

The application of the device will be better understood by reference to Fig. 3, where the device is represented as applied to the class of meter shown and described in my Reissue Patent No. 10,778. Upon the lower end of the spindle A is a collar, $f$, which is arranged to come in contact with a collar, $e'$, which is secured to the driving-stud fastened to the center of the piston D. The two collars are of a size to throw the spindle out of position, and when the piston is in its normal condition sufficient to give the required motion to the upper end of the spindle, which moves the registering device. As the piston revolves in the case it imparts a vibrating motion to the spindle, the upper end of which comes in contact with a pawl attached to the registering-gear. To still further reduce the friction and make the piston run easier, the collar $f$ may be made loose on the spindle, so as to revolve thereon and cause a rolling instead of a sliding or rubbing movement between the piston and spindle. The collar $e'$ may also loosely fit the piston-stud to still further lessen the extent of friction.

I am aware that it is not new to use a diaphragm in a meter for the purpose of forming the fulcrum, upon which is vibrated a spindle for communicating motion of the working parts of the meter to registering devices outside of the meter-case, and I therefore do not claim the same, broadly, such a device being shown in the Patent to H. Isham, No. 34,147, dated January 14, 1862.

Having thus fully described my invention, I claim and desire to secure by Letters Patent of the United States—

1. The combination, in a water-meter, of the moving part of said meter with the casing of the water-chamber of the meter, the registering mechanism located outside of said chamber, and an intermediate device for transmitting the motion of the moving part of the piston to the registering mechanism, comprising a spindle firmly secured to a rubber or flexible holder having a disk or diaphragm and an elongated projection extending from the disk about said spindle, as and for the purposes described.

2. In a water-meter, the combination of the casing of the water-chamber, having a hole formed therein, with a spindle for communicating the movement of the movable part of the meter to the registering mechanism and molded thereon, a rubber or flexible holding device having a disk or diaphragm larger than the hole in the case, and an inward extension about the spindle, and a collar for clamping the disk to the casing, substantially as described.

3. The combination, in a water-meter, of the casing C, having the hole $e$ and a recess upon its inner surface surrounding said hole, with the spindle A, the flexible holder B, having a disk which fits the recess in the casing and which is made thicker at its center and molded on the spindle, and a clamping-ring fastened to the casing for clamping the disk against the under surface thereof, substantially as described.

4. The combination of the movable part or piston of a water-meter, its stud, and a taper collar fitted thereto, with the registering mechanism, the connecting-spindle secured to the casing, as specified, and having a taper collar upon its inner end, as and for the purposes described.

JAMES A. TILDEN.

Witnesses:
F. F. RAYMOND, 2d,
J. M. DOLAN.